United States Patent [19]

Chin et al.

[11] Patent Number: 4,916,612

[45] Date of Patent: Apr. 10, 1990

[54] DUAL CHANNEL SIGNAL SELECTION AND FAULT DETECTION SYSTEM

[75] Inventors: Richard H. Chin, Seattle; Asamitsu Maeshiro, Renton; Richard W. Hess, Redmond, all of Wash.

[73] Assignee: The Boeing Company, Seattle, Wash.

[21] Appl. No.: 115,853

[22] Filed: Nov. 2, 1987

[51] Int. Cl.$^4$ ............................................. G05B 9/03
[52] U.S. Cl. .................... 364/424.01; 371/36; 244/184; 364/428
[58] Field of Search ............... 364/424.01, 447, 428; 318/564; 371/68, 36; 244/194, 184, 183

[56] References Cited

U.S. PATENT DOCUMENTS

| | | | |
|---|---|---|---|
| 2,993,665 | 7/1961 | Carpenter | 244/183 |
| 3,361,392 | 1/1968 | Doniger et al. | 244/181 |
| 3,819,914 | 6/1974 | Bettinger et al. | 244/181 |
| 3,837,603 | 9/1974 | Schultz et al. | 244/184 |
| 3,843,077 | 10/1974 | Boone et al. | 244/184 |
| 3,918,622 | 11/1975 | Vircks et al. | 244/184 |
| 4,006,870 | 2/1977 | Boone et al. | 244/184 |
| 4,092,578 | 5/1978 | Fabian | 318/564 |
| 4,130,241 | 12/1978 | Meredith et al. | 371/36 |
| 4,162,438 | 7/1979 | Osder | 318/564 |
| 4,209,734 | 6/1980 | Osder | 318/564 |
| 4,497,059 | 1/1985 | Smith | 371/36 |
| 4,533,999 | 8/1985 | Lambregts | 244/183 |

FOREIGN PATENT DOCUMENTS 1078521  8/1967  United Kingdom ................ 244/184

*Primary Examiner*—Parshotam S. Lall
*Assistant Examiner*—Thomas G. Black
*Attorney, Agent, or Firm*—Christensen, O'Connor, Johnson & Kindness

[57] ABSTRACT

A signal selection and fault detection system that provides triple functional redundancy using the outputs ($Y_A$, $Y_B$) of two unmonitored primary channels and the output of one or the other of two complementary filters (22, 34) that each receive and process a signal (Y dot IRU) that is derived from a third, independent primary signal source (18) and that is representative of the rate or first derivative of the primary signals ($Y_A$, $Y_B$). During non-failure conditions, the system output ($Y_{CF1}$) is generated by a normal mode complementary filter 22 from the synthesized rate signal (Y dot IRU) and the selected (10) midvalue one of this output signal ($Y_{CF1}$) and the primary signals ($Y_A$, $Y_B$). In the event of a suspected failure in one of the primary signals, the output ($Y_{IRU}$) of a failure mode complementary filter is substituted (16) for the system output signal ($Y_{CF1}$) as the third input (C) to the midvalue selector (10). The system includes a fault monitor (24) and a fault detector (26) to monitor the selected signal and generate switching signals (LOC FAIL, IC FILT, SELCHA, SELCHB) that control the switching between the normal mode and failure mode complementary filters and the isolation of the failed channels. Provisions (30, 32) are made for initializing integrators (52, 54) in the failure mode complementary filter and for varying the band width (C1, C2, A1, A2) of both the failure mode and the normal mode complementary filters as a function of a parameter that influences the primary signals.

13 Claims, 4 Drawing Sheets

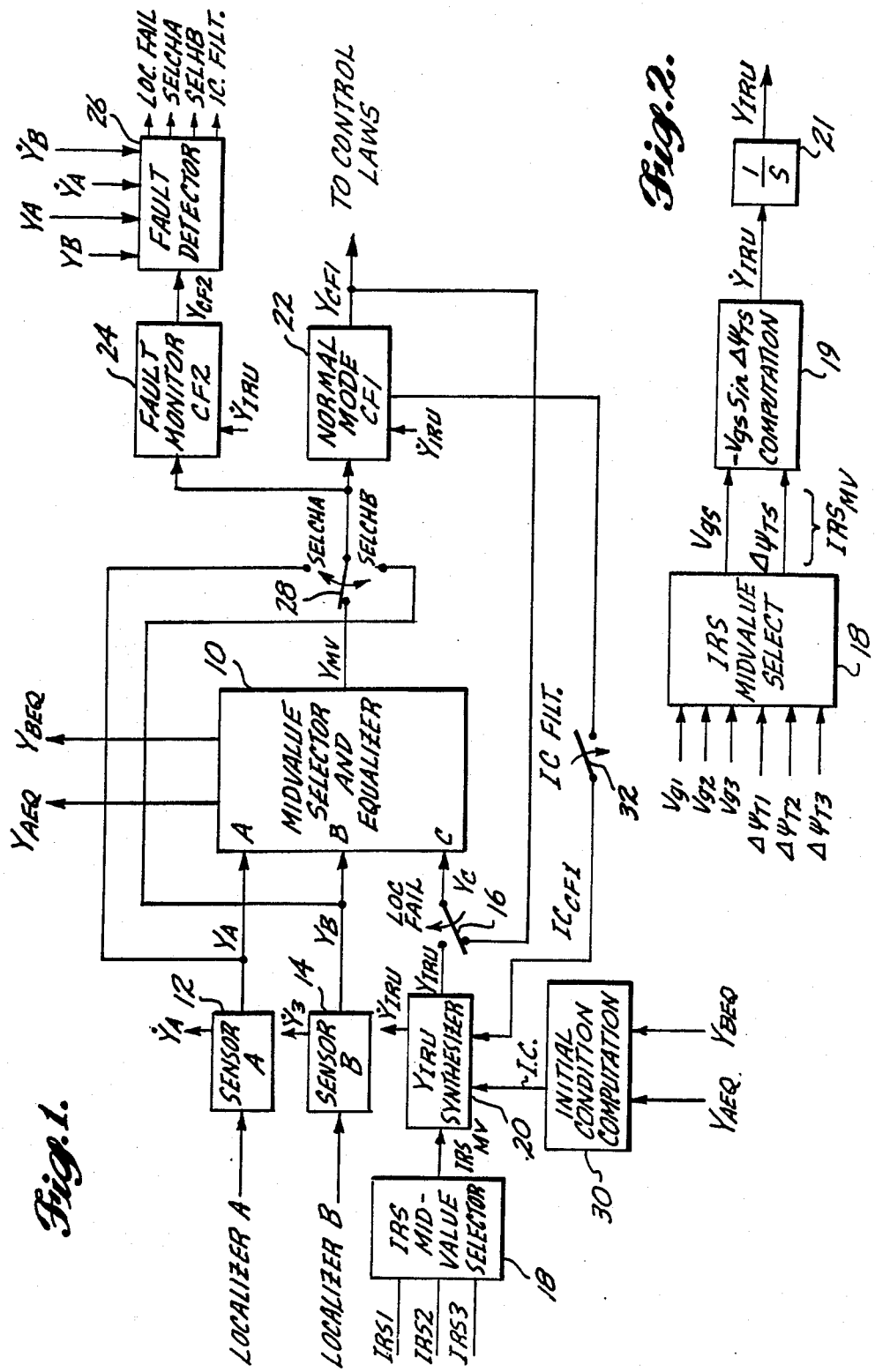

DUAL CHANNEL SIGNAL SELECTION AND FAULT DETECTION SYSTEM

BACKGROUND OF THE INVENTION

The present invention relates generally to signal selection and fault detection within the control systems art. More particularly, the invention concerns a system for detecting an unannounced failure in the outputs of dual redundant condition sensors and for providing a suitable substitute for the failed signal so that an associated control system remains operational.

In control systems, and particularly in control systems in the aviation art, redundant channel signal processing is frequently used to increase the reliability and safety of the system. For example, it is known to usen three separate sensors to sense the same aircraft parameter to provide redundant signals that are processed by circuitry that selects that signal, or a combination of signals, which is most likely to be representative of the actual aircraft parameter. Examples of such signal selection systems are described in U.S. Pat. No. 4,276,648 to Tomlinson and U.S. Pat. No. 4,472,806 to Blair.

A high degree of system reliability is particularly important in the autoland system the control the automatic landing of an aircraft. It is particularly desirable that these systems have fail operative characteristics to assure safe landing of the aircraft under all conditions. Heretofore, such fail operative characteristics have been implemented using either unmonitored sensors arranged in three independent channels or by using dual fully- or self-monitored channels. Each of these options necessarily adds to the complexity and cost of the autoland system.

U.S. Pat. No. 3,881,670 to Doniger discloses an alternative approach for providing fail operative characteristics to a redundant aircraft control system. In the desired system, the output signals from a pair of unmonitored condition sensors are applied to an averaging voter/monitor along with a third signal that derived by integrating the output of another sensor that is on board the aircraft. This approach has several disadvantages. First, the output of the averaging voter is used as the system output under both normal and failure conditions. Consequently if the fault detection circuitry is not quick to reject a failed channel, the system output will erroneously follow the failed channel. Secondly, the integrator that produces the third input to the averaging voter is slaved to the voter output to eliminate integrator drift. As a result, this third input signal is also susceptible to erroneous influence in the event that the signal from a failed channel is averaged into the final output of the system.

The present invention provides an arrangement that overcomes the above-described disadvantages and achieves triple functional redundancy using the outputs of two unmonitored condition sensors and one or the other of two auxiliary signals as the inputs to a midvalue selector. These two auxiliary signals are synthesized from the output of a third, distinct sensor and are alternately applied to the midvalue selector in accordance with the operational condition of the two unmonitored sensors, i.e., depending upon whether these sensors are operating normally, are suspected to have failed, or have failed.

SUMMARY OF THE INVENTION

In accordance with the invention, there is provided a signal selection and fault detection system that is fail operative. The system includes a midvalue selector having first and second inputs that are connected to receive first and second redundant input signals that correspond to a sensed condition. The midvalue selector includes a third input that is connected to receive a third input signal that is representative of the sensed condition. In a normal mode of operation, i.e., when neither of the first and second redundant input signals has failed, or is about to fail, the third input signal is produced by a normal mode complementary filter, which integrates a condition rate signal that is representative of the rate of change of the condition.

In accordance with a further aspect of the invention, where the condition varies in accordance with an independent parameter, the normal mode complementary filter has a bandpass that varies in a predetermined manner as a function of this parameter. In a preferred implementation of the invention in an aircraft autoland system, where the sensed condition is localizer deviation (i.e., lateral deviation from centerline), the bandpass of the normal mode complementary filter is varied as a function of altitude.

In accordance with an additional aspect of the invention, the system includes failure detection means for monitoring the two redundant input signals and rate signals that correspond thereto. As long as the difference between the redundant input signals and the rate signals remains below a first predetermined threshold, the system is deemed to be operating in a normal or non-failed condition. Under such conditions, the normal mode complementary filter receives the selected output of the midvalue selector and the condition rate signal.

When, however, the above signal difference exceeds the first predetermined threshold, the failure detection means provides a suspected failure signal that serves an indication that one or the other of the primary input channels may have failed.

When such a suspected failure condition occurs, the output of a failure mode complementary filter is substituted in lieu of the output of the normal mode complementary filter as the third input to the midvalue selector. The failure mode complementary filter operates upon the condition rate signal to generate this second auxiliary signal. According to a further aspect of the invention, during the normal mode of operation, an initializing or synchronizing signal is continuously fed to the failure mode complementary filter in order to provide an accurate initial reference for that filter in the event of failure. In a preferred form, this synchronization of the failure mode complementary filter is accomplished by continuously inputting a signal that is representative of the average of the equalized redundant input signals, i.e., the average of the first and second input signals equalized with respect to the output of the midvalue selector.

According to still other aspects of the invention, the system further operates to detect and confirm that one of the input condition signals has, in fact, failed. For this purpose, the failure detection means further includes rate monitoring and detecting means that monitors the rate of deviation between the two redundant input signals and generates a detected failure discrete signal when that rate of deviation exceeds a predetermined threshold rate. In response to this detected failure signal, channel selection means determines which one of the redundant input signals is a failure and substitutes the non-failed input signal as an input to the normal mode complementary filter in lieu of the output of the midvalue selector. As a consequence, the system output (i.e., the output of the normal mode complementary filter) is completely independent of the output of the failed channel and dependent only upon the output of the remaining good channel and the condition rate signal derived from the auxiliary source.

In a preferred embodiment, the normal mode complementary filter and the failure mode complementary filter each have a pair of integrators. In this arrangement, when there is a detected failure, the integrators in the failure mode complementary filter are one-shot initialized by momentarily coupling the outputs of the integrators of the normal mode complementary filter to the corresponding integrators in the failure mode complementary filter. In this manner, the failure mode complementary filter assumes its controlling role by starting at the state that was present in the normal mode complementary filter at the time of a detected failure. This is to be contrasted to the suspected failure situation, in which the failure mode complementary filter is pre-initialized (during the normal mode of operation) to the average of the equalized input signals. For the detected failure situation, an averaging technique is not utilized since it would undesirably introduce the effects of the failed channel into the determination of the initial conditions.

BRIEF DESCRIPTION OF THE DRAWINGS

The invention can be understood by the following portion of the of the specification taken in conjunction with the accompanying drawings in which:

FIG. 1 is a block diagram of a signal selection and fault detection system according to the invention;

FIG. 2 is a block diagram of a portion of the system of FIG. 1 illustrating the manner in which the condition rate signal and the second auxiliary signal are generated;

DETAILED DESCRIPTION OF THE PREFERRED EMBODIMENT

Figure 3:
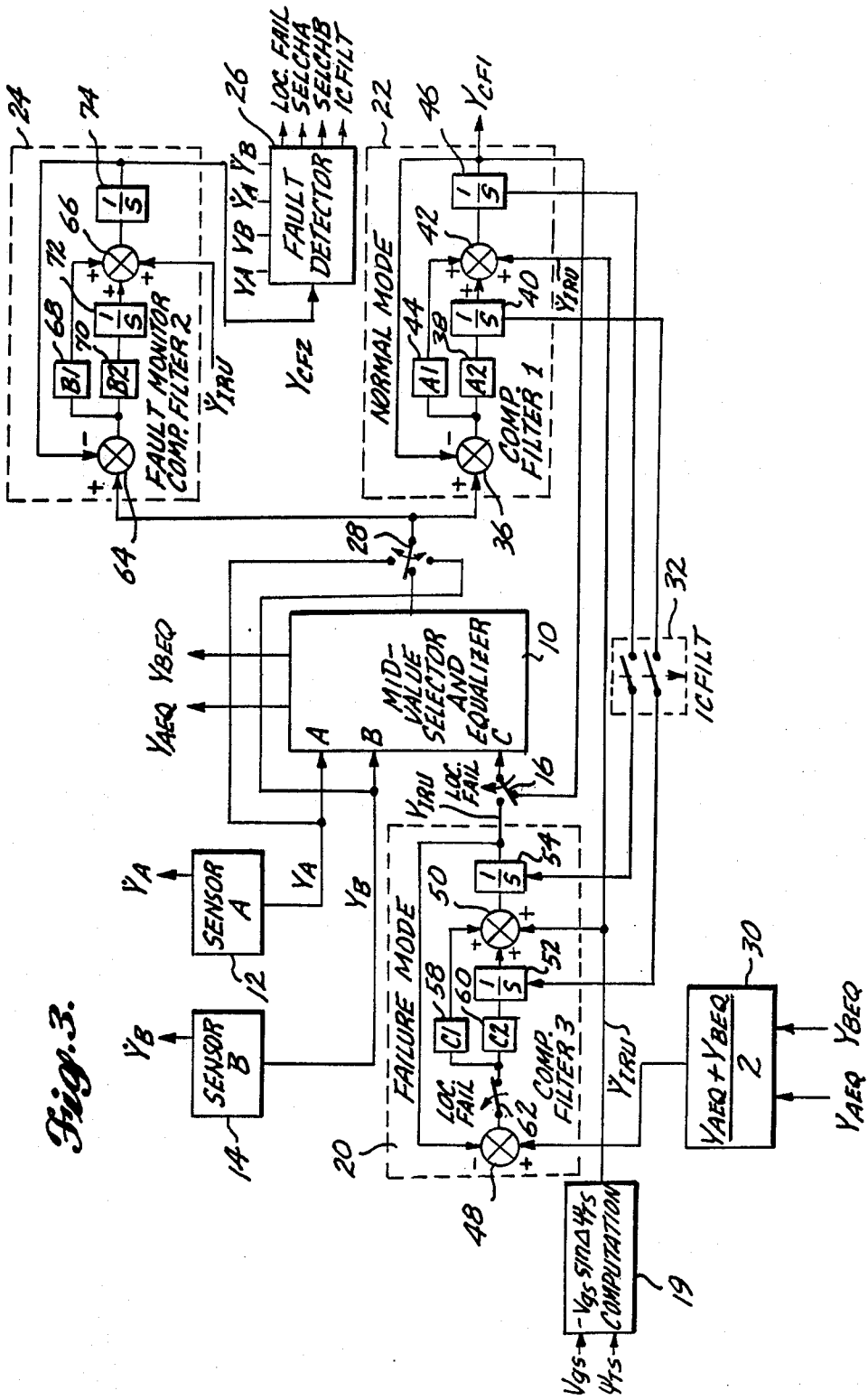
FIG. 3 is a block diagram showing the system of FIG. 1 in greater detail.

Referring to FIG. 1, the signal selection and fault detection system of the present invention, as implemented in an aircraft autoland configuration, includes a midvalue selector and equalizer 10 that operates in a conventional manner to produce at its output that input signal (equalized) which has a value between the remaining input signals. The construction of such circuits is well known in the art as shown, for example, by the aforementioned patent No. 4,276,648 to Tomlinson, the disclosure of which is hereby incorporated by reference. The midvalue selector and equalizer 10 is connected to receive input data signals on three inputs A, B, and C. Inputs A and B receive the output signals $Y_A$ and $Y_B$ from two redundant sensors 12 and 14, respectively. In the implementation under discussion, the redundant sensors 12 (sensor A) and 14 (sensor B) are localizer receivers that receive lateral localizer signals labeled "LOCALIZER A" and "LOCALIZER B" in FIG. 1. The localizer receiver output signals (converted to feet) $Y_A$ and $Y_B$ are redundant input signals that represent localizer deviation, i.e., the lateral deviation of the aircraft from the runway centerline.

The third input C of the midvalue selector and equalizer 10 is connected to a switch 16 to receive as a third input signal $Y_C$, one or the other of two auxiliary signals that are representative of the localizer output signals $Y_A$ and $Y_B$. The generation of these two auxiliary input signals will be discussed in greater detail hereinafter. For purposes here, it is to be understood that these two auxiliary signals are synthesized from a third signal that is derived from a primary signal source that is independent of the source of the two localizer signals that are supplied to the input sensors 12 and 14. In the illustrated autoland system, the aircraft inertial reference system is the independent source of the signal that is used to synthesize or generate the two auxiliary input signals that are representative of the localizer receiver output signals $Y_A$ and $Y_B$.

Referring to FIG. 1, this inertial reference signal $IRS_{MV}$ is the selected or voted output of an IRS midvalue selector 18. This midvalue selector is of conventional design and operates to select the midvalue one of three inertial reference signals IRS1, IRS2, and IRS3. The selected IRS signal $IRS_{MV}$ is coupled to a synthesizing circuit 20 ($Y_{IRU}$ synthesizer) where it is used to synthesize a rate term that is representative of the first derivative of the localizer deviation, i.e., a signal that represents the rate of deviation of the aircraft from the centerline. This rate term is labeled $Y_{IRU}$ in FIG. 1 and is referred to herein as "Y dot IRU". This synthesized rate term is integrated in the synthesizing circuit 20 to produce the auxiliary "localizer" signal $Y_{IRU}$ and is fed to a normal mode complementary filter (CF1) 22 and fault monitor complementary filter (CF2) 24. The manner in which these complementary filters utilize the rate term Y dot IRU will be discussed hereinafter. For the present, it is to be noted that the output of the normal mode complementary filter $Y_{CF1}$ constitutes the system output, i.e., the output of the signal selection and fault detection system that is coupled to the main aircraft control system. During the normal mode of operation, i.e., when neither of the primary localizer channels have failed, the normal mode complementary filter output signal $Y_{CF1}$ is supplied via switch 16 as the third input signal to the midvalue selector and equalizer 10.

FIG. 2 illustrates in greater detail the manner in which the Y dot IRU and $Y_{IRU}$ signals are generated. Each of the three inertial reference input signals IRS1, IRS2, and IRS3 has a ground speed component ($V_{g1}$, $V_{g2}$, $V_{g3}$) and a track angle course error ($\Delta\psi_{T1}$, $\Delta\psi_{T2}$, $\Delta\psi_{T3}$) which is the angular deviation between the flight path and the course. The selected midvalue signal $IRS_{MV}$ has the components $V_{gs}$ and $\psi_{TS}$ and is fed to a computation circuit 19. The computation circuit mathematically calculates the rate term by multiplying the selected ground speed component $V_{gs}$ by the sine of the course error ($\Delta\psi_{TS}$). This computation is based upon the geometrical relationship between the path and course and yields a result ($-V_{gs} \sin \Delta\psi_{TS}$) that represents the rate of deviation from the runway centerline. This result is the synthesized rate term Y dot IRU that is representative of the first derivative of the localizer signals. To produce a signal $Y_{IRU}$ (referred to herein as the "second auxiliary localizer signal") that is representative of the two receiver output signals $Y_1$ and $Y_B$, the synthesized rate term Y dot IRU is supplied to an integrator 21 (corresponding to integrator 54, which is part of $Y_{IRU}$ synthesizer 20 in FIG. 3).

Referring again to FIG. 1, the second auxiliary localizer signal $Y_{IRU}$ is supplied to the third input C of the midvalue selector and equalizer 10 when it is determined that one or the other of the primary localizer channels may have failed. Under this condition, described herein as a "suspected failure", the switch 16 is moved to the auxiliary position so as to couple the $Y_{IRU}$ signal to the midvalue selector 10. As a result of this switching action, the normal mode complementary filter 22 no longer controls or influences the voting process while the suspected failure condition exists. This filter does however, continue to receive the selected midvalue localizer signal $Y_{MV}$ and the synthesized rate signal Y dot IRU and to produce, in response thereto, the system output signal $Y_{CF1}$. If the detected error returns to normal limit, such that the suspected failure condition no longer exists, switch 16 will return to its normal position to supply the system output signal $Y_{CF1}$ to the midvalue selector.

The decision or determination to substitute the Y dot IRU signal for the $Y_{CF1}$ signal as the third input to the midvalue selector is made in a fault monitoring subsystem that includes the fault monitor 24 and a fault detector 26. The fault monitor 24 receives as input signals the synthesized rate signal Y dot IRU and the selected midvalue localizer signal $Y_{MV}$ (during normal modes of operation) or one of the other of the two localizer receiver output signals $Y_A$ and $Y_B$ (under conditions of failure). The coupling of one of these three signals ($Y_A$, $Y_B$, $Y_{MV}$) is effected through a switch 28 that is controlled by two switch signals SELCHA and SELCHB that are generated by the fault detector 26. In general, if the fault detector determines that channel B has failed, it generates the SELCHA signal that causes the switch to the upper position as seen in the view of FIG. 1. When this occurs, the localizer receiver output signal $Y_A$ for channel A is directly coupled to the normal mode complementary filter 22 and the fault monitor 24. The normal mode complementary filter 22 then generates the system output signal $Y_{CF1}$ based upon the localizer signal $Y_A$ and the synthesized rate term Y dot IRU. Since the operation of switch 28 isolates the output of the midvalue selector 10, the output $Y_B$ of the failed channel no longer effects the system output. In the reverse situation, where channel A rather than channel B fails, the fault detector 26 generates the SELCHB signal that switches the switch 28 to the lower position seen in FIG. 1 so as to isolate the output of the midvalue selector 10 and directly couple the localizer signal $Y_B$ from channel B as the input to the normal mode complementary filter 22 and the fault monitor 24. The system output signal $Y_{CF1}$ then is based upon the output $Y_B$ of the remaining good channel and the synthesized rate term Y dot IRU.

In order to make the various determinations as to faults and to generate the switching signals, the fault detector 26 receives the output $Y_{CF2}$ from the fault monitor 24 and four additional inputs $Y_A$, $Y_B$, Y dot A ($\dot{Y}_A$ in FIG. 1) and Y dot B ($\dot{Y}_B$ in FIG. 1). The two input signals, Y dot A and Y dot B, are localizer rate signals for channel A and channel B, respectively, and are produced in sensors 12 and 14, respectively, in a conventional manner.

As will be discussed more fully hereinafter, the fault detector 26 processes these five input signals and compares them to various thresholds to generate four control signals LOC FAIL, SELCHA, SELCHB and IC FILT. The LOC FAIL signal is a "suspected failure signal" that controls switch 16 and serves as an indicator that one or the other of channels A and B may have failed. The IC FILT signal is an initial condition signal that is also referred to herein as a "detected failure signal". This signal is generated following a determination that one or the other of the localizer channels has, in fact, failed. When such a failure is detected, the IC FILT signal is generated and maintained for a short duration to momentarily close an initialization switch 32. As will described in greater detail in conjunction with the FIG. 3, the purpose of this momentary closure of switch 32 is to initialize integrators included in the synthesizing circuit 20 with the conditions existing at the time of failure on integrators included in the normal mode complementary filter 22. Consequently, the effect of this initialization is to provide a good reference from which the synthesized reference signal $Y_{IRU}$ can be generated.

To be prepared in the event of a failure, it is desirable to initialize the synthesizing circuit with the signals that indicate the condition of the aircraft just prior to a failure. For this purpose, the synthesizer 20 is initialized or synchronized to the average of the two localizer signals. More precisely, a signal equal to the average of the equalized localizer signals $Y_{AEQ}$ and $Y_{BEQ}$ is generated in the initial condition computation circuit 30 and continuously input to the synthesizer circuit 20. The signals $Y_{AEQ}$ and $Y_{BEQ}$ are equalized localizer signals that are, respectively, the localizer signals $Y_A$ and $Y_B$ equalized with respect to the selected midvalue localizer signal $Y_{MV}$. These signals are generated in the midvalue selector and equalizer 10 in a conventional manner. As will be seen below during the discussion of FIG. 3, the initial condition signal, which represents the average of the two localizer signals, is continuously input to the synthesizing circuits during the normal mode of operation and is disconnected as an input upon the occurrence of a suspected failure (as indicated by generation of the LOC FAIL signal by the fault detector 26).

Considering now the operation of the system of FIG. 1, during normal conditions (neither one of the localizer channels has failed or is suspected of failing) the midvalue selector and equalizer 10 receives, as inputs, the two localizer signals $Y_A$ and $Y_B$ and the normal mode complementary filter output signal $Y_{CF1}$ (as a "first auxiliary localizer signal"). The normal mode complementary filter receives the selected midvalue localizer signal $Y_{MV}$ and utilizes that signal and the synthesized rate signal Y dot IRU to produce its output signal, which output signal comprises the output for the signal selection and fault detection system. When the fault detector 26 determines that there may be a failure in one or the other of the localizer channels, it generates a suspected failure signal LOC FAIL that operates switch 16 to substitute the synthesized second auxiliary localizer signal $Y_{IRU}$ for the output of the normal mode complementary filter as the third input to the midvalue selector and equalizer 10. To provide a proper reference from which to begin generation of the second auxiliary localizer signal $Y_{IRU}$, the synthesizing circuit 20 is continuously fed the average of the two localizer signals during the normal mode of operation. This initializing process is discontinued upon the detection of a suspected failure. Thereupon, the synthesizing circuit 20 generates the second auxiliary input signal $Y_{IRU}$ by integrating a rate term that is computed from the voted output of the IRS midvalue selector 18.

Several important observations should be noted in the just described suspected failure mode of operation of the system. First, the system output appearing at the output of the normal mode complementary filter is generated from the selected localizer signal $Y_{MV}$ and the synthesized rate term Y dot IRU. Since the rate term Y dot IRU is, in turn, generated from a midvalue voter, it necessarily has its own fail-operative characteristics. These characteristics are carried over into and influence the normal mode complementary filter which produces the system output. Secondly, it will be noted that, in the suspected failure mode, the second auxiliary signal is dependent onyl upon the output of the IRS midvalue selector and, consequently, is completely independent of the final system output signal $Y_{CF1}$. This should be contrasted with the normal mode of operation in which the first auxiliary localizer signal that is applied to input C of the midvalue selector is dependent upon the system output (in fact, it is the system output $Y_{CF1}$).

When the fault detector 26 determines that there has been a failure in one or the other of the channels, it generates the IC FILT signal which causes the initialization switch 32 to momentarily close and one-shot initialize the synthesizing circuit 20. The fault detector also generates either the SELCHA or SELCHB signals which operate upon the switch 28 to couple the non-failed channel as the input to the normal mode complementary filter 22 in lieu of the output of the midvalue selector and equalizer 10.

FIG. 3 shows the system of FIG. 1 in greater detail and, especially, the configuration of the normal mode and fault monitor complementary filters 22 and 24, respectively, and the synthesizing circuit that generates the second auxiliary localizer signal $Y_{IRU}$. Considering first the normal mode complementary filter 22, this filter includes a summing junction 36 that receives, during normal modes of operation, the output of the midvalue selector and equalizer 10 and subtracts therefrom the normal mode complementary filter output signal $Y_{CF1}$. The result is coupled to a multiplier 38 where it is multiplied by a gain A2. The resultant signal is then integrated in a first integrator 40 and applied to one of the three inputs of an adder 42. The other two inputs to adder 42 are the synthesized rate signal Y dot IRU and the output of the summing junction 36 multiplied by a gain A1 in multiplier 44. The output of the adder 42 is then integrated in a second integrator 46 to produce the system output signal (normal mode complementary output signal) that constitutes the system output signal and the first auxiliary localizer signal that is applied via switch 16 to terminal C of the midvalue selector and equalizer 10.

The use of a complementary filter as the output stage in the present system has a number of advantages. First by using both a Y and Y dot input (i.e., $Y_{MV}$ and Y dot IRU) complementary smoothing and, hence a better signal is obtained. Secondly, since a rate term (Y dot IRU) is supplied to the complementary filter, notwithstanding a catastrophic failure in the localizer signals, the downstream control laws, i.e., the overall autopilot is prevented from following a step input such as that resulting from a hardover condition.

According to an additional aspect of the invention, the normal mode complementary filter is programmed as a function of altitude to take into account the distortions that are known to occur in the radio beams produced by localizer transmitters. These distortions in the beams are unpredictable and can be expected to vary from airport to airport. In general, however, the extent of these so called "beam bends" increases with a distance from the transmitters.

The bandpass of the complementary filter is varied as a function of altitude to compensate for these beam bends. The use of altitude as the functional parameter is selected in accordance with the recognition that, when the aircraft is in an approach mode, there is a correlation between the altitude of the aircraft and its distance from the airport. At greater distances from the airport (and hence higher altitudes) it is known that there is a greater degree of beam bending. At such distances it is more likely that detected errors are the results of a beam rather than an equipment failure. Therefore, it is desirable for the complementary filter to track the beam bends more closely. For this purpose, the gains are selected so that the normal mode complementary filter operates as a wide bandpass filter at high altitudes.

When the aircraft is closer to the runway (and thus, at a lower altitude) it is important to reject any high frequency bend disturbances and noise that are likely not indicative of the proper flight path. Consequently, for low altitudes (low distances from the runway) the gains A1 and A2 are selected so that the filter operates as a low bandpass filter. There are, of course, various ways to program the gains A1 and A2 to achieve the desired variable bandpass. In one implementation, these gains were linearly programmed as a function of aircraft altitude.

The effect of changing the bandpass is that a higher altitudes, the system follows the localizer beams, quickly producing tight beam control, while at lower altitudes, the system follows only slow bends in the beam and, thus, assures a smooth landing and the rejection of disturbances that are more likely to be the result of equipment failure.

The construction of the synthesizing circuit 20 (also referred to herein as a failure mode complementary filter) is substantially identical to the construction of the normal mode complementary filter 22. It includes a pair of summing junctions 48 and 50, first and second integrators 52 and 54, respectively, and a pair of multipliers 58 and 60 having programmable gains C1 and C2, respectively. The gains C1 and C2 are programmed as a function of altitude in like manner to the programming of the gains A1 and A2 of the normal mode complementary filter 22. Specifically, the gains are programmed as a linear function of altitude so that the filter has high frequency characteristics at high altitudes and low frequency characteristics at low altitudes in order to enable tight beam control and a smooth landing.

As mentioned above, the failure mode complementary filter is initialized by continuously inputting the average of the equalized localizer signals. This signal is developed in the initial condition computation circuit 30 by averaging the two localizer signals $Y_{AEQ}$ and $Y_{BEQ}$ that are generated in the midvalue selector and equalizer 10. This average of the two equalized localizer signals is coupled as an input to the summing junction 48. The output of the filter, i.e., the second auxiliary localizer signal $Y_{IRU}$, is fed back to the summing junction 48 and subtracted from the average of the equalized localizer signals. The result is coupled through a switch 62 to the multipliers 58 and 60. The output of multiplier 60 is integrated in integrator 52 and then supplied to the summing junction 50 where it is added with the output of the multiplier 58 and the synthesized rate term Y dot IRU. The resultant signal is integrated in the second integrator 54 to produce the second auxiliary localizer signal $Y_{IRU}$.

As discussed above, the output of the initial condition computation circuit 30 is continuously inputted to the failure mode complementary filter during the normal mode of operation for the purpose of establishing a valid initial reference for the integrators 52 and 54 in the event that a suspected failure is detected. It is for this purpose that the filter includes switch 62, which is normally closed, as shown in FIG. 3. This switch is controlled by the suspected failure signal LOC FAIL that is generated by the fault detector 26. Noting that the LOC FAIL signal also controls the switch 16 coupled to input C of the midvalue selector, the transition from the normal mode of operation to the suspected failure mode of operation can now be understood. Specifically, during the normal mode of operation, the switches 16 and 62 are in their illustrated positions and the normal mode complementary filter "controls" the third input to the midvalue selector and equalizer 10. Although the output of the failure mode complementary filter 20 is isolated during this normal mode of operation, it is continuously synchronized to the average of the two localizer signals so as to be prepared to assume "control" over the midvalue selector in the event of a suspected failure. When such a suspected failure occurs, the switches 16 and 62 are moved to their alternate position so that the output $Y_{IRU}$ of the failure mode complementary filter 20 is coupled to the midvalue selector and equalizer 10 in lieu of the output $Y_{CF1}$ of the normal mode complementary filter. Referring to FIG. 3, it will be observed that the opening of the switch 62 in response to the LOC FAIL signal effectively removes the multipliers 58 and 60 and the integrator 52 from the circuit such that the failure mode complementary filter operates as a pure integrator, i.e., the second auxiliary localizer signal $Y_{IRU}$ is produced by the integrator 54 operating upon the synthesized rate term Y dot IRU supplied to the summing junction 50. From this operation, it will be appreciated that during the suspected failure mode of operation, the controlling second auxiliary localizer signal $Y_{IRU}$ is dependent upon only the synthesized rate term and, consequently, is immune from error that might otherwise be introduced by inputting the localizer signals or signals derived therefrom. It should be noted that the system returns to normal configuration when the "suspicious" failure condition diminishes (i.e., recovery is permitted).

As discussed in relation to FIG. 1, the fault detector 26 generates a detected failure signal IC FILT that momentarily closes the switch 32 to initialize the integrators that produce the second auxiliary localizer signal $Y_{IRU}$ with the values that exist at the time of failure on the integrators in the normal mode complementary filter 22. This operation can be seen better in the FIG. 3 where the switch 32 is shown to be a pair of switches that operate to connect the first and second integrators 40 and 46, respectively, in the normal mode complementary filter 22 with the first and second integrators 52 and 54, respectively, in the failure mode complementary filter 20.

The fault monitor complementary filter 24 is constructed similarly to the normal mode complementary filter 24, having a pair of summing junctions 64 and 66, a pair of multipliers 68 and 70 having gains B1 and B2, respectively, and first and second integrators 72 and 74, respectively. These components operate in the same manner as the corresponding components in the normal mode complementary filter to process the synthesized rate term Y dot IRU and the output of the midvalue selector and equalizer 10 or one of the other of the two localizer signals $Y_A$ or $Y_B$ to produce an output signal $Y_{CF2}$ that corresponds to the localizer signals. The fault monitor complementary filter 24 differs from the normal mode of complementary filter 22 in that the gains B1 and B2 of the multipliers 68 and 70 are not programmed as a function of altitude (as are the gains A1 and A2 of the multipliers 38 and 44). Instead, the gains B1 and B2 have predetermined fixed values. The reason for this distinction lies in the monitoring function of the fault monitor complementary filter 24. To perform this monitoring function, it is important that the filter be able to follow beam bends (i.e., high frequency signals) at both high and low altitudes. For this purpose, the gains B1 and B2 are selected so that the filter operates as a filter with wide bandwidth.

Figure 4:
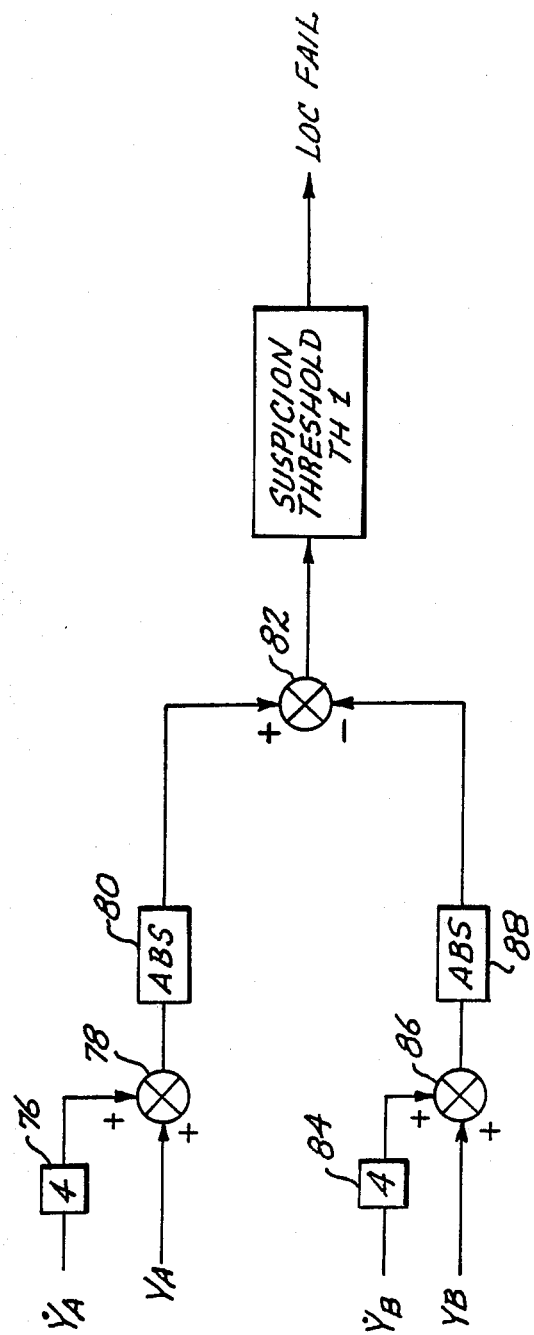
FIG. 4 is a block diagram illustrating the portion of the fault detection circuit of FIGS. 1 and 3 that produces the suspected failure signal.
Figure 5:
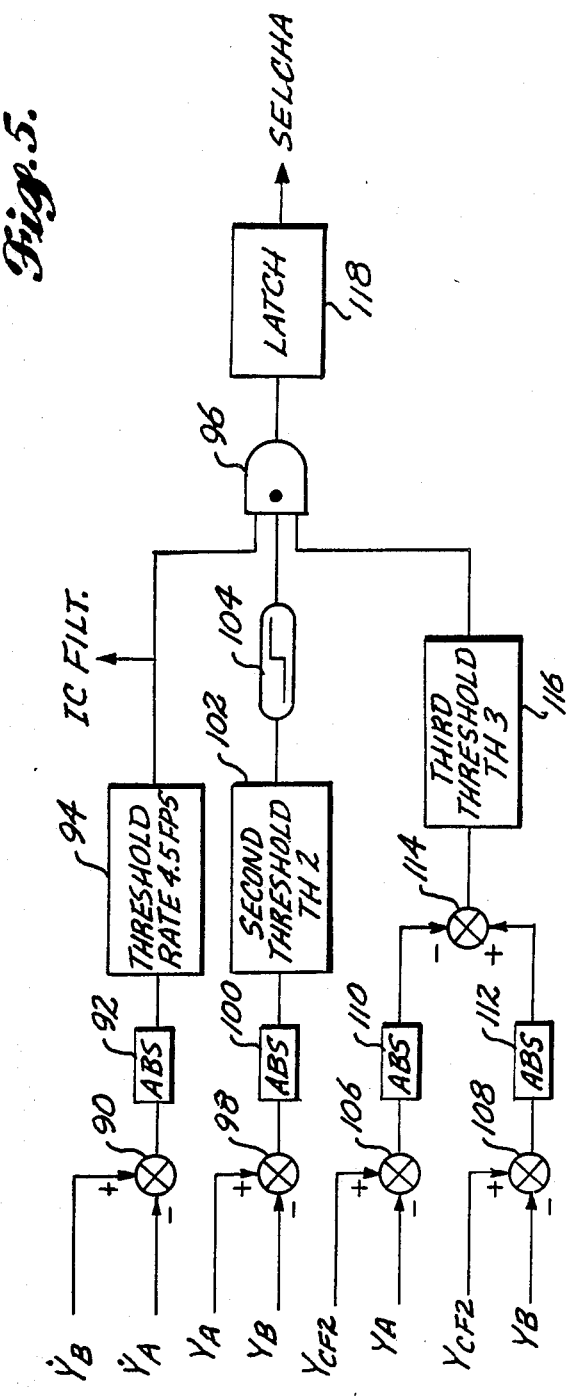
FIG. 5 is a block diagram illustrating the portion of the fault detection circuit of FIGS. 1 and 3 that produces the detected failure signal and one of the channel select signals.

The manner in which the fault detector 26 makes its fault determinations and generates the switching signals can be better understood with reference to FIGS. 4 and 5. Referring first to FIG. 4, the suspected failure signal LOC FAIL is generated when the signals from the two localizer receivers disagree beyond a first threshold, or suspicion threshold, TH1. More specifically, the difference between the absolute value of the sum of four times the localizer rate signal Y dot A and the localizer receiver signal $Y_A$ and the absolute value of the sum of four times the localizer rate signal Y dot B and the localizer receiver signal $Y_B$ is compared against the first threshold TH1. For this purpose, the localizer rate signal Y dot A is given a gain of four in a multiplier 76 and fed to a summing junction 78 where is added with the localizer signal $Y_A$. The absolute value of the resultant signal is taken in an absolute value circuit 80 and supplied to a summing junction 82. Similar operations are performed for the B channel, with the localizer rate signal Y dot B being given a gain of four in a multiplier 84 and summed at a summing junction 86 with the localizer signal $Y_B$. The absolute value of the result is then taken in an absolute value circuit 88 and that absolute value subtracted at the summing junction 82 from the results of the operation of the A channel signals. The output of the summing junction 82 is then compared against the suspicion threshold TH1. Several observations concerning their circuitry in FIG. 4 should be made. First, an indication of the lateral rate of deviation (Y dot A and Y dot B) is included in the comparison between the lateral deviation ($Y_A$ and $Y_B$) in order to obtain a fast response to a failure. Secondly, to further fine tune the detection of a suspected failure, it is desirable to schedule the suspicion threshold TH1 with altitude to insure a constant angular threshold as the aircraft approaches the localizer transmitter.

Referring now to FIG. 5, a "detected failure" condition is detected by comparing the rate of deviation between the outputs of the two localizer channels. For this purpose, the difference between the localizer rate signals Y dot B and Y dot A is obtained at a summing junction 90 and the result thereof fed through an absolute value circuit 92. The resultant absolute value between the Y dot A and Y dot B signals is compared against a predetermined threshold rate in a threshold rate comparator 94. If the difference signal exceeds the threshold rate, this results in a determination that one of the localizer channels has, in fact, failed and is signified by generation of the IC FILT signal. The detection of such a failure in the aircraft arts is frequently referred to as a "hardover" condition, which is to be contrasted with a suspected failure that occurs at a lower rate of change, which is commonly referred to as a "slowover" condition.

Because of the serious nature of a hardover failure, it is desirable to make additional confirmatory checks when such a condition is indicated. For this purpose, the divergence between the localizer output signals are compared against a second threshold. More precisely, the difference between the localizer signals $Y_A$ and $Y_B$ is taken at a summing junction 98, fed through an absolute value circuit 100 and compared against the second predetermined threshold TH2 in a threshold comparator 102. When the difference so obtained exceeds the second threshold for a predetermined time as determined in timer 104 the hardover condition is confirmed. The system then selects the non-failed signal by determining which of those signals is closer to the output $Y_{CF2}$ of the fault mode complementary filter 24.

FIG. 5 shows the manner in which the determination is made to select the A channel as the non-failed channel. First, the difference is taken between the fault monitor complementary filter output signal $Y_{CF2}$ and the localizer signal $Y_A$ at a summing junction 106 and the difference between the fault monitor complementary filter output signal $Y_{CF2}$ and the localizer signal $Y_B$ is taken at a summing junction 108. The absolute value of the resulting signals is taken in absolute value circuits 110 and 112 and the difference between the resultant signals taken in a summing junction 114. This difference signal is then compared against a third predetermined threshold in a comparator 116. The output of comparator 116 is fed to an AND gate 96, which also receives the output of the threshold rate comparator 94 and the threshold comparator 102 (via the timer 104). If each of the three thresholds (in comparators 94, 102 and 116) are exceeded and gate 96 produces an output that is latched in a latch 118 and utilized in the example herein as the select channel A signal SELCHA. Although not illustrated in the FIGURES, an identical arrangements exists in order to generate the select channel B signal SELCHB. For this purpose, the circuit is identical to that shown in FIG. 5, with the exception that the signs on the summing junction 114 are reversed. In this manner, the gate corresponding to AND gate 96 produces a signal that indicates that the A channel has failed and that operates switch 28 so as to select the B channel as the input for the normal mode complementary filter 22.

From the foregoing, it will be appreciated that the invention provides a signal selection and fault detection system that accomplishes triple functional redundancy through the use of two unmonitored redundant channels and a separate auxiliary channel. In the context of an aircraft autoland system, the inventive system permits the implementation of a fail operative system utilizing two redundant localizer channels and a third "localizer" channel that is synthesized from the output of the inertial reference system. Since triple redundancy is required for the IRS system, its availability for producing the third "localizer" signal needed for the autoland system allows the elimination of one of the ILS systems and one of the radio altimeters that would otherwise be required for a triple channel redundant system.

While the invention has been discussed in a lateral axis autoland context, it is to be understood that it is equally applicable for control of the longitudinal axis autoland system. Furthermore, it is to be understood that the invention is not to be construed as being limited to use on board aircraft or in the aviation arts. While the invention has been described with reference to a preferred embodiment, it will be understood by those skilled in the art that the invention is not limited thereto and that the scope of the invention is to be interpreted only in conjunction with the following claims.

The embodiments of the invention in which an exclusive property or privilege is claimed are defined as follows:

1. An aircraft signal selection and fault detection system, comprising:
    a midvalue selector having an output and first, second, and third inputs, said first and second inputs being connected to receive first and second redundant localizer signals that are representative of the deviation of an aircraft from a runway centerline, said third input being connected to receive a third input signal that is representative of said deviation, said midvalue selector producing at its output the input signal corresponding to the midvalue of said input signals;
    means for producing a synthesized rate signal that is representative of the rate of deviation of the aircraft from said runway centerline;
    a normal mode complementary filter connected to receive said synthesized rate signal and the output of said midvalue selector, said filter being responsive to said signals to produce a normal mode complementary filter output signal that is representative of said deviation; and
    means for coupling said normal mode complementary filter output signal as the third input signal to said midvalue selector.

2. The system of claim 1, wherein said means for producing a synthesized rate signal comprises:
    an IRS midvalue selector connected to receive three redundant inertial reference signals, said IRS midvalue selector producing a midvalue inertial reference signal that is the midvalue one of said inertial reference signals; and
    computation means responsive to said midvalue inertial reference signal for producing said synthesized rate signal.

3. The system of claim 2, wherein:
    said midvalue inertial reference signal includes a ground speed component representative of the ground speed of an aircraft along a flight path and an angular component representative of the angular deviation of an aircraft from a desired course; and
    said computation means includes means for computing a track angle error signal from said angular component and means for generating said synthesized rate signal by multiplying said ground speed component by the sine of said track angle signal.

4. A signal and fault detection system, comprising:
    a midvalue sector having an output and first, second, and third inputs, said first and second inputs being connected to receive first and second redundant input signals, respectively, that correspond to a condition, said condition varying in accordance with a parameter, said third input being connected to receive a third input signal that is representative of said condition, said midvalue selector producing at its output the input signal corresponding to the midvalue of said input signals;

means for producing a condition rate signal that is representative of the rate of change of said condition;

a normal mode complementary filter connected to receive said condition rate signal and the output of said midvalue selector, said filter being responsive to said signals to produce a normal mode complementary filter output signal that is representative of said condition, said filter having a bandpass that varies in a predetermined manner as a function of said parameter; and means for coupling said normal mode complementary filter output signal as the third input signal to said midvalue selector.

5. A signal selection and fault detection system, comprising:

a midvalue selector having an output and first, second, and third inputs, said first and second inputs being connected to receive first and second redundant input signals, respectively, that correspond to a condition, said third input being connected to receive a third input signal that is representative of said condition, said midvalue selector producing at its output the input signal corresponding to the midvalue of said input signals;

means for producing a condition rate signal that is representative of the rate of change of said condition;

a normal mode complementary filter connected to receive said condition rate signal and the output of said midvalue selector, said filter being responsive to said signals to produce a normal mode complementary filter output signal that is representative of said condition;

failure detection means for monitoring said redundant input signals and for providing a suspected failure signal when the difference between said redundant input signals exceeds a first predetermined threshold;

a failure mode complementary filter connected to receive said condition rate signal, said filter producing a failure mode complementary filter output signal that is representative of said condition; and means for coupling said normal mode complementary filter output signal as the third input signal to said midvalue selector, said means for coupling including means responsive to said suspected failure signal for substituting said failure mode complementary filter output signal for said normal mode complementary filter output signal as the third input signal to said midvalue selector.

6. The system of claim 5, wherein said condition comprises a condition that varies in accordance with a parameter and wherein said failure mode complementary filter has a bandpass that varies in a predetermined manner as a function of said parameter.

7. The system of claim 6, wherein said normal mode complementary filter has a bandpass that varies in a predetermined manner as a function of said parameter.

8. The system of claim 5, further including:

equalizing means for compensating each of said first and second input signals with respect to the output of said midvalue selector to provide first and second equalization signals;

averaging means connected to said equalizing means for providing an average equalization signal representative of the average of said first and second equalization signals; and means responsive to said suspected failure signal for selectively coupling said average equalization signal to said failure mode complementary filter, said average equalization signal being so coupled only when the difference between said redundant input signals is below said first predetermined threshold.

9. The system of claim 5 wherein said failure detection means includes:

rate monitoring and detecting means for monitoring the rate of deviation between the two redundant input signals applied to the first and second inputs of said midvalue selector and for generating a detected failure signal when said rate of deviation exceeds a predetermined threshold rate, said detected failure signal providing an indication that one of said redundant input signals is a failure; and channel selection means for determining which one of said redundant input signals is a failure and, in response thereto, for isolating the output of said midvalue selector as an input to said normal mode complementary filter and for substituting therefore as an input to said normal mode complementary filter the one of said redundant input signals that is not a failure.

10. The system of claim 9, wherein said channel selection means includes:

input signal monitoring and detecting means for monitoring said first and second redundant input signals and for providing a failure confirmation signal when the difference between said redundant input signals exceeds a second predetermined threshold;

comparison means for comparing the difference between said first redundant input signal and a predetermined reference signal with the difference between said second redundant input signal and said predetermined reference signal to produce a difference signal;

channel-select signal generating means, connected to said comparison means, to said input signal monitoring and detecting means, and to said rate monitoring and detecting means, for generating a channel-select signal when the rate of deviation between said input signals exceeds said threshold rate, when the difference between said redundant input signals exceeds said second predetermined threshold, and when the difference signal produced by said comparison means exceeds a third predetermined threshold, said channel-select signal being indicative of the one of said redundant input signals that is not a failure; and a channel-select switch connected to the output and first and second inputs of said midvalue selector and to the input of said normal mode complementary filter, said channel-select switch normally coupling the output of said midvalue selector to the input of said normal mode complementary filter, said channel-select switch being responsive to said channel-select signal to uncouple the output of said midvalue selector output from the input to said complementary filter and to selectively couple, as the input to said complementary filter, the one of said redundant input signals that is not a failure.

11. The system of claim 10, further including:

a fault monitoring complementary filter connected to receive said condition rate signal and the output of said midvalue selector, said filter producing a fault monitoring signal that is representative of said condition; and wherein said fault monitoring signal is the predetermined reference signal used by said comparison means.

12. The system of claim 9, wherein:

said normal mode complementary filter includes first and second integrators, the output of said first integrator being provided as an input to said second integrator, the output of said second integrator comprising said failure mode complementary filter output signal; and further including means responsive to said detected failure signal for selectively and momentarily coupling the outputs of the first and second integrators of said normal mode complementary filter to the first and second integrators, respectively, of said failure mode complementary filter.

13. The system of claim 12, wherein said condition rate signal is provided as an input to the second integrator of said failure mode complementary filter and wherein said filter includes means responsive to said suspected failure signal for disabling selected components of said filter such that only said second integrator is operable and said condition rate signal is the only input to said second integrator.

* * * * *

UNITED STATES PATENT AND TRADEMARK OFFICE
CERTIFICATE OF CORRECTION

PATENT NO. : 4,916,612

DATED : April 10, 1990

INVENTOR(S) : R.H. Chin et al.

It is certified that error appears in the above-identified patent and that said Letters Patent is hereby corrected as shown below:

Column 4, line 32, "$Y_{IRU}$" should be --$\dot{Y}_{IRU}$--

Column 12, line 60 (Claim 4, line 1), after "signal" insert --selection--

Column 14, line 23 (Claim 9, line 15), "therefore" should be --therefor--

Signed and Sealed this

Eleventh Day of June, 1991

Attest:

HARRY F. MANBECK, JR.

*Attesting Officer*   *Commissioner of Patents and Trademarks*